United States Patent [19]

Isao et al.

[11] Patent Number: 4,659,764

[45] Date of Patent: Apr. 21, 1987

[54] POLYVINYL CHLORIDE RESIN COMPOSITIONS FOR MOLDING

[75] Inventors: Matsuura Isao, Ibaraki; Masanori Kobayashi, Kobe; Akira Wakatsuki, Ibaraki, all of Japan

[73] Assignee: Sumitomo Chemical Company, Limited, Osaka, Japan

[21] Appl. No.: 840,521

[22] Filed: Mar. 12, 1986

[51] Int. Cl.$^4$ ................................................ C08K 5/09
[52] U.S. Cl. .................................... 524/399; 524/400; 524/436; 524/567
[58] Field of Search ................ 524/399, 400, 436, 567

[56] References Cited

U.S. PATENT DOCUMENTS

| | | | |
|---|---|---|---|
| 3,262,896 | 7/1966 | Ackerman | 524/299 |
| 3,510,441 | 5/1970 | Huntzinger | 524/399 |
| 3,640,747 | 2/1972 | Richart | 427/185 |
| 4,379,882 | 4/1983 | Miyata | 524/437 |

FOREIGN PATENT DOCUMENTS 52-50212  12/1977  Japan.
58-71152  4/1983  Japan.

OTHER PUBLICATIONS

R. E. Lally et al., Modern Plastics Encyclopedia (Dec. 1949) pp. 111, 112, 114, 116, 156 to 162.
H. Verity Smith "Stabilizers for Vinyl Polymers Part I, Soaps" British Plastics 176-179, May 1954.
Deanin et al., "Synergism in Thermal Stabilization of Polyvinyl Chloride" Polymer Eng. & Sci. Jan. 1973, vol. 13, No. 1, 35-39.
F. Chevassus et al., *The Stabilization of Polyvinyl Chloride*, 173-1975, 1963.
European Search Report: Prof. Kurt Thinius, "Stabilisierung und Alterung von Plastwerkstoffen", Akademie-Verlag, Berlin (1969) pp. 217-224.

*Primary Examiner*—Veronica P. Hoke
*Attorney, Agent, or Firm*—Wenderoth, Lind & Ponack

[57] ABSTRACT

A polyvinyl chloride powder molding composition is made which is resistant to staining upon thermal exposure when used as a covering for polyurethane articles. Staining of the mold lining is also inhibited. The polymer composition affording these advantages comprises a dry blended mixture of a vinyl chloride resin, a plasticizer, a pigment, a filler and as a thermal stabilizer, a barium-zinc $C_6$ to $C_9$ carboxylic acid soap mixture and at least one inorganic magnesium compound.

3 Claims, No Drawings

POLYVINYL CHLORIDE RESIN COMPOSITIONS FOR MOLDING

This application is a continuation of now abandoned application Ser. No. 680,296, filed Dec. 10, 1984, now abandoned.

The present invention relates to a polyvinyl chloride resin composition for powder molding superior in mold-staining preventing ability on powder molding (hereinafter referred to as a polyvinyl chloride powder composition). More particularly, the present invention relates to a polyvinyl chloride powder composition suitable for a covering material for automobile inner parts such as crash pads, arm rests, head rests, console boxes, meter covers, door trims, etc.

In recent years, as materials for crash pads, arm rests, head rests, console boxes, meter covers, door trims and the like, those materials of complicated shape which are light in weight and have embossed or stitched patterns are being used more frequently. Such materials are rich in softness as well as possessing high quality feeling on the surface, thus are more in demand.

Hitherto, there are two kinds of covering material, one being vacuum-formed products of plasticized sheet composed mainly of a polyvinyl chloride resin and an ABS resin (hereinafter referred to as vacuum-formed product), and the other being rotational molded- or slush-molded products of paste sols composed mainly of a polyvinyl chloride paste resin and a plasticizer (hereinafter referred to as a sol molded product).

The vacuum-formed product meets the object in terms of light weight, but it is poor in softness of feeling so that only those of a stiff touch are obtained. Besides, it is extremely difficult in terms of fabricating techniques to obtain the formed product of a complicated shape having embossed or stitched patterns of high-quality on the surface.

Also, the vacuum-formed product has a defect in that, because of its large residual strain on vacuum forming, cracks are easily formed during a long-term use.

On the other hand, the sol molded product has a soft feeling, but the sol, because of its low gelation temperature, rapidly melts in the mold so that such phenomena as flow marks, lips, stringiness of the sol, etc. appear. The sol molded product, therefore, has defects that its inside surface lacks smoothness, removal of the sol from the mold takes a too long time, and the thickness of the covering material becomes large.

Further, the sol has also problems in that a great deal of labor is required in cleaning tanks, pipes, etc. for color changes, and that the viscosity changes with the lapse of time so that the sol cannot be stored for long periods.

In recent years, a powder molding method is attracting public attention as a means to solve these defects and problems.

The powder molding method includes a fluidized bed coating, electrostatic coating, powder flame spray coating, powder rotational molding, powder slush molding techniques and the like. A powder composition used in these techniques should be superior in free-flowability and moldability.

It is well known to produce powder compositions by dry-blending polyvinyl chloride resins, plasticizers, stabilizers, pigments, etc. on blenders or high-speed rotating mixers equipped with a heating jacket.

It is also well known to add small amounts of polyvinyl chloride resin fine powders or inorganic fillers such as calcium carbonate fine powders, etc. in order to improve the free-flowability (Rubber Digest, Vol. 14, No. 8, 32–40; Polyvinyl Chloride—Its Chemistry and Industry—II, pp. 367–370, 1968; and Japanese Patent Publication No. 1575/962).

An object of the present invention is to provide a polyvinyl chloride powder composition superior in mold-staining preventing ability on powder molding (hereinafter referred to as resistance to mold staining).

The present invention will be illustrated in more detail. In powder molding, a polyvinyl chloride powder composition is molded as attached to a mold kept at high temperatures, so that the surface of the mold is gradually stained as the number of molding shots increases. Consequently, molding works cannot help stopping the operation temporarily for cleaning the mold, as a result of which the productivity is markedly reduced and extra labor is required for cleaning. When the mold is markedly stained on molding, the molded covering material becomes difficult to detach from the mold, stains on the mold are transferred to the surface of the covering material, and in some cases, the thickness of the material becomes large.

It becomes therefore very important industrially and economically to develop polyvinyl chloride powder compositions which produce little stain on molds, in other words, are superior in resistance to mold staining.

The present inventors have made extensive studies to develop polyvinyl chloride powder compositions superior in resistance to mold staining on powder molding, and as a result, found it desirable to use a stabilizer comprising the metal soap of a fatty acid having a $C_5$–$C_8$ alkyl group.

In powder compositions comprising dry-blending polyvinyl chloride resins, plasticizers, stabilizers, pigments and others such as fillers and auxiliaries are added as the need arises. An object of the present invention is to provide a polyvinyl chloride resin composition for powder molding superior in resistance to mold staining characterized in that said composition contains 0.1 to 10 parts by weight of a stabilizer, which is represented by the formula, $$(RCOO)_2Me$$

wherein R represents a combination of a $C_5$–$C_8$ alkyl group and Me represents barium and zinc, and which barium and zinc is present in a metal weight ratios of 1:2 to 5:1, based on 100 parts by weight of a polyvinyl chloride resin.

In powder molding, since polyvinyl chloride powder compositions are molded as attached to the mold kept at high temperatures, too a great importance is set on the thermal resistance of the composition. As a result, in the selection of metal soap stabilizers, it is common to use the same stabilizer as used in common extrusion and calendering comprising the metal soap of a fatty acid having an alkyl group of not less than 9 carbon atoms, for example stearates [$C_{17}H_{35}COO-$], palmitates [$C_{15}H_{31}COO-$], laurates [$C_{11}H_{23}COO-$], caprates [$C_9H_{19}COO-$], etc.

But, powder molding is different from common extrusion and calendering in that the powder is brought into contact with the mold kept at high temperatures for only a short time, and besides that little shear is applied to the powder. The popularly used stabilizers comprising the metal soap of a fatty acid having an alkyl group of not less than 9 carbon atoms are of a powdery form in many cases. In powder molding, however, it was found that such stabilizers are poor in dispersibility and besides, because of their high melting point, do not sufficiently melt, being present in part as powder.

It was also found that, even though the above stabilizers are ones produced by thoroughly kneading the metal soap of a higher fatty acid and a liquid substance such as solvents, plasticizers, etc., with the PVC resin, the compatibility between the stabilizers and PVC is poor and also a plate-out phenomenon occurs.

Further, since the mold has finely embossed or stitched patterns on the surface, occurrence of this plate-out phenomenon makes it very troublesome to remove stains from the mold.

On the other hand, the metal soap of fatty acids having an alkyl group of not more than 8 carbon atoms, for example nonanoates [$C_8H_{17}COO-$], octanoates [$C_7H_{15}COO-$], heptanoates [$C_6H_{13}COO-$], hexanoates [$C_5H_{11}COO-$], etc., is poor in thermal property and lubricating action and difficult to produce, so that it is not used generally too much in common extrusion and calendering. If it is used, it is used in many cases in combination with stabilizers comprising the metal soap of fatty acids having an alkyl group of not less than 9 carbon atoms.

The present inventors, attention given to that, in powder molding, a contact time between the mold heated to high temperatures and the polyvinyl chloride powder composition is only several seconds to 10 minutes and no shear is applied to the composition, made an extensive study and succeeded in producing polyvinyl chloride powder composition superior in resistance to mold staining, which is the first object of the present invention, by using the metal soap of fatty acids having a $C_5$–$C_8$ alkyl group.

The metallic salts of fatty acids having a $C_5$–$C_8$ alkyl group used in the present invention are barium and zinc salts. The barium-containing stabilizer includes for example barium nonanoate, barium octanoate, barium heptanoate and barium hexanoate.

The zinc-containing stabilizer includes zinc nonanoate, zinc octanoate, zinc heptanoate and zinc hexanoate.

In the present invention, both the barium-containing and zinc-containing stabilizers are used in combination, and a preferred metal weight ratio of barium to zinc is 1:2 to 5:1.

When the barium:zinc weight ratio is smaller than 1:2, that is, zinc is in excess relative to barium, there are dangers such as a reduction in thermal resistance on molding, formation of black specks and foaming of the molded covering material. Such weight ratio is not therefore preferred.

Contrary to this, when the barium:zinc weight ratio is larger than 5:1, that is, barium is in excess relative to zinc, initial coloration on molding tends to become strong, particularly a tendency to be colored red is remarkable. As a result, since the color of the molded covering material deviates from the desired one, color matching becomes difficult.

The amount of the foregoing barium/zinc-containing stabilizer used is preferably within a range of 0.1 to 10 parts by weight based on 100 parts by weight of a polyvinyl chloride resin.

When said amount of the stabilizer is less than 0.1 part by weight, the thermal resistance on molding becomes unpreferably poor.

When said amount of the stabilizer is more than 10 parts by weight, there is a danger of the stabilizer bleeding onto the surface of the molded covering material, and besides the cost increases to make it economically disadvantageous.

In order to provide, as a final product, a covering material for automobile inner parts, polyurethane should be foamed in place on the inside surface of the molded covering material.

In this polyurethane foaming in place, it is well known to use the first component composed mainly of a polyol, water, a foaming agent, a catalyst and other auxiliaries as well as a second component composed mainly of polyisocyanate.

In this polyurethane foaming in place, however, the following amine compounds are used as catalyst: ethylenediamine, triethylenediamine, triethylenetetramine, triethanolamine, etc. which may be used alone or in combination, and their addition products with alkylene oxide, such as ethylene oxide, propylene oxide, butylene oxide, epichlorohydrin, styrene oxide, etc. But, these amine compounds, on being contacted with a polyvinyl chloride covering material, remarkably promotes discoloration and deterioration of the material.

Consequently, it is important to develop polyvinyl chloride powder compositions superior in their ability to prevent the discoloration and deterioration by amine compounds (hereinafter referred to as amine resistance). This development is the second object of the present invention.

The present inventors completed the development of a polyvinyl chloride powder composition superior in both resistance to mold staining and amine resistance by combining the foregoing barium/zinc stabilizer and a magnesium compound.

In powder compositions comprising dry-blending polyvinyl chloride resins, plasticizers, stabilizers, pigments and others such as fillers and auxiliaries added as need arises, another object of the present invention is to provide a polyvinyl chloride resin composition for powder molding superior in both resistance to mold staining and in amine resistance characterized in that said composition contains 0.1 to 10 parts by weight of a stabilizer, which is represented by the formula:

$$(RCOO)_2Me$$

wherein R represents a $C_5$–$C_8$ alkyl group and Me represents barium or zinc, and in which barium and zinc are present in metal weight ratios of 1:2 to 5:1, and 0.1 to 5 parts by weight of a magnesium compound based on 100 parts by weight of a polyvinyl chloride resin.

In the development of the polyvinyl chloride powder composition superior in amine resistance, the present inventors examined the thermal resistance (gear oven, 110° C.) and light fastness (Sunshine weather-O-meter or fade-O-meter; black panel temperature, 83° C.) of a two-layer sheet comprising the polyvinyl chloride covering material and polyurethane foamed in place, and found that the zinc compound has an ability to prevent discoloration by amine compounds. This finding is based on the following thinking: In systems wherein a polyvinyl chloride resin and an amine compound coexist, dehydrochlorination is promoted or a complex compound is formed by reaction between the resin and the amine compound to develop a characteristic color; but when a zinc stabilizer is present in the system, another complex compound is formed from the stabilizer and the amine compound, and in this case, a complementary relationship applies between the colors of both complex compounds to produce a harmless color.

In the foregoing thermal resistance and light fastness tests on the polyvinyl chloride/polyurethane two-layer sheet described above, the present inventors extensively studied a method to maintain the discoloration preventing ability for a further longer time, and as a result, found that the amine resistance is improved by using a magnesium compound together. Further, the present inventors found that the use of a magnesium compound is accompanied by an effect that adhesion strength between the polyvinyl chloride covering material and polyurethane layer is kept unchanged even after prolonged thermal resistance and light fastness tests.

The magnesium compound used in the present invention includes for example magnesium oxide, magnesium hydroxide, magnesium phosphate, magnesium perchlorate, basic magnesium carbonate, magnesium/aluminum compounds (e.g. hydrotalcite) and the like. These compounds may be used alone or in combination.

The amount of the magnesium compound used is preferably in the range of 0.1 to 5 parts by weight based on 100 parts by weight of a polyvinyl chloride resin.

When said amount is less than 0.1 part by weight, both an improvement in the amine resistance and the adhesion strength of the polyvinyl chloride/polyurethane two-layer sheet after the ageing tests are insufficient.

While, when said amount is more than 5 parts by weight, the film strength of the polyvinyl chloride covering material is insufficient, and in the initial coloration of the material on molding tends to be strongly reddish, so that such amount is not preferred.

The stabilizer used in the present invention is a barium/zinc metal soap of fatty acids having a $C_5$-$C_8$ alkyl group, and a barium/zinc/magnesium stabilizer comprising combining said barium/zinc metal soap with a magnesium compound. These stabilizers are each added to the system at the step of dry-blending. In this case, they may be added alone, or in mixtures with a solvent, plasticizer, epoxy compound, antioxidant, photo-stabilizer, ultraviolet absorber, phosphorus chelater, polyhydric alcohol and if necessary, a pigment.

To the foregoing barium/zinc or barium/zinc/magnesium stabilizer of the present invention may be added small amounts of a stabilizer or inorganic compound described below. The stabilizer is a metal soap except the one of fatty acids having an alkyl group of not less than 9 carbon atoms, and for example, there are given a calcium, magnesium, barium, zinc and aluminum metal soaps of a monohydric carboxylic acid (e.g. benzoic acid, toluic acid, acetoxybenzoic acid) or dihydric carboxylic acid (e.g. oxalic acid, malonic acid, succinic acid, glutaric acid, adipic acid, sebacic acid, phthalic acid). The inorganic compound includes for example carbonates, phosphates, phosphites, silicates, calcium carbonate fine powder, aluminum hydroxide, alumina/silica sol, perchlorates and the like.

The polyvinyl chloride resin used in the present invention includes vinyl chloride polymers, copolymers of vinyl chloride with ethylene, propylene or vinyl acetate and graft copolymers of vinyl chloride with ethylene/vinyl acetate copolymer (EVA). These polymers and copolymers are produced by suspension polymerization, bulk polymerization or emulsion polymerization, and they may be used alone or in combination. But, the polyvinyl chloride resin of the present invention is not limited to these polymers and copolymers.

As the plasticizer used in the present invention, there are used, for example, phthalic acid esters such as dibutyl phthalate, dioctyl phthalate, diisodecyl phthalate, diisoundecyl phthalate, etc.; trimellitic acid esters such as trioctyl trimellitate, tri-2-ethylhexyl trimellitate, tridecyl trimellitate, etc.; adipic acid esters such as dioctyl adipate, diisodecyl adipate, etc.; phosphoric acid esters such as tricresyl phosphate, trioctyl phosphate, etc.; epoxy plasticizers and liquid polyesters. But, the plasticizer of the present invention is not limited to these compounds.

As the polyol, catalyst, foaming agent, polyisocyanate, etc. used in the polyurethane foaming in place of the present invention, the well-known ones commonly used in the production of polyurethane foams are good enough, there being no special limitation.

The present invention will be illustrated specifically with reference to the following examples, which are not however to be interpreted as limiting the invention thereto.

EXAMPLE 1

To a 20-liter super-mixer was added 2 kg of a straight polyvinyl chloride resin having an average polymerization degree of 700 produced by common suspension polymerization (Sumilit ® SX-7GL; produced by Sumitomo Chemical Co.) Separately from this, 25 g of barium octanoate and 25 g of zinc octanoate (both are stabilizers), 70 g of epoxidized soybean oil and 110 g of a gray pigment containing 3 g of a thioether antioxidant (Antigen ® OS; produced by Sumitomo Chemical Co.) and 2 g of a ultraviolet absorber (Viosorb ® 580; produced by Kyodo Yakuhin Co.) were thoroughly dispersed in 400 g of trioctyl trimellitate. This dispersion liquid and then 1 kg of trioctyl trimellitate were added to the super-mixer while stirring at a definite revolution speed, and the mixture was dried up by heating.

After cooling, the dried-up product was uniformly mixed with 200 g of a polyvinyl chloride paste resin fine powder produced by the micro-suspension method (Sumilit ® PXQL; produced by Sumitomo Chemical Co.) to produce a powder composition of good free-flowability.

100 Grams of this powder composition was sprinkled for 10 seconds on a nickel mirror plate [100 mm×100 mm×3 mm (thick)] kept at 220° C. on an electric heating hot plate. The mirror plate was then taken off the hot plate, and after removing the unmelted powder, the mirror plate having the molten resin attached thereto was again placed on the hot plate and heated for 30 seconds to complete fusion. After cooling and removing the formed sheet, the mirror plate was again placed on the hot plate and the above procedure was repeated five times. After the test, the degree of cloudiness of the mirror plate was examined to find that the plate has little cloudiness, showing a good appearance.

EXAMPLE 2

A powder composition was prepared in the same manner as in Example 1 but using 120 g of a liquid comprising 60% of dodecylbenzene and as a stabilizer, 40% of barium/zinc octanoate previously adjusted to a barium:zinc metal weight ratio of 2:1. The shot test was repeated five times on the same hot plate to examine the degree of cloudiness of the nickel mirror plate. As a result, it was found that the plate has little cloudiness in completely the same manner as in Example 1, showing a good appearance.

EXAMPLE 3

A powder composition was prepared in the same manner as in Example 1 but using as a stabilizer, 120 g of the barium/zinc octanoate used in Example 2 and 4 g of magnesium oxide. The shot test was repeated five times on the same hot plate to examine the degree of cloudiness of the nickel mirror plate. As a result, it was found that the plate has little cloudiness in completely the same manner as in Example 1.

EXAMPLE 4

A powder composition was prepared in the same manner as in Example 1 but using as a stabilizer, 120 g of the barium/zinc octanoate used in Example 2 and 4 g of magnesium hydroxide. The shot test was repeated five times on the same hot plate to examine the degree of cloudiness of the nickel mirror plate. As a result, it was found that the plate has little cloudiness in completely the same manner as in Example 1.

EXAMPLE 5

A powder composition was prepared in the same manner as in Example 1 but using as a stabilizer, 120 g of the barium/zinc octanoate used in Example 2, 4 g of magnesium hydroxide and 4 g of hydrotalcite (DHT-4; produced by Kyowa Kagaku Co.). The shot test was repeated five times on the same hot plate to examine the degree of cloudiness of the nickel mirror plate. As a result, it was found that the plate has little cloudiness in completely the same manner as in Example 1.

COMPARATIVE EXAMPLE 1

The procedure was carried out in completely the same manner as in Example 1 but using 40 g of barium stearate and 40 g of zinc stearate as a stabilizer. The result of the test was unsatisfactory, and white thin film-like stains were observed on the surface of the mirror plate.

COMPARATIVE EXAMPLE 2

The procedure was carried out in completely the same manner as in Example 1 but using 40 g of barium stearate and 35 g of zinc laurate as a stabilizer. The result of the test was unsatisfactory, and white thin film-like stains were observed on the surface of the mirror plate like Comparative example 1.

COMPARATIVE EXAMPLE 3

The procedure was carried out in completely the same manner as in Example 1 but using 35 g of barium laurate and 10 g of zinc octanoate as a stabilizer. The result of the test was also unsatisfactory as compared with the results of Examples 1 to 4, and slightly white thin film-like stains were observed on the surface of the mirror plate.

COMPARATIVE EXAMPLE 4

The procedure was carried out in completely the same manner as in Example 1 but using 24 g of barium stearate, 12 g of barium palmitate, 4 g of barium laurate and 40 g of zinc stearate as a stabilizer and 4 g of magnesium hydroxide. The result of the test was also unsatisfactory like Comparative example 1.

COMPARATIVE EXAMPLE 5

The procedure was carried out in completely the same manner as in Example 1 but using 24 g of barium stearate, 12 g of barium palmitate, 4 g of barium laurate and 40 g of zinc stearate as a stabilizer, 4 g of magnesium hydroxide and 16 g of hydrotalcite (DHT-4; produced by Kyowa Kagaku Co.). The result of the test was also unsatisfactory like Comparative example 1.

The powder compositions obtained in Examples 1 to 5 and Comparative Examples 1 to 5 were formed into sheet as described below, and the amine resistance was tested.

500 Grams of each powder composition was sprinkled on an electroformed nickel plate with embossed patterns (300 mm × 300 mm) kept at 220° C. in a heating furnace wherein the atmospheric temperature was 300° C. After attaching the composition to the plate for 10 seconds, the plate was taken off the furnace and the unmolten powder was removed. The Plate having the molten powder attached thereto was again placed in the furnace and heated for one minute at an atmospheric temperature of 300° C. to complete fusion. After cooling, the formed sheet was removed. The thickness of the sheet was 1 mm on the average.

Thereafter, the formed sheet was placed, with its embossed surface faced downwards, on an aluminum support frame [300 mm × 300 mm × 10 mm (thick)] placed on an aluminum foaming plate. Separately from this, water, triethanolamine and triethylenediamine were added to polyol composed mainly of glycerin/propylene oxide and glycerin/ethylene oxide adducts to prepare a mixture. Into the above support frame were injected this mixture and Polymeric MDI having an NCO content of 30.5% so that the total amount was 153 g and the weight ratio of former to latter was 100 parts to 50 parts by weight, to carry out foaming, whereby a polyurethane foam firmly adhered to the back surface of the sheet was obtained. This polyurethane foam had a thickness of 10 mm and a foam density of 0.16 g/cm$^3$.

This polyvinyl chloride/polyurethane two-layer sheet was cut into a desired size of 70 mm × 150 mm to prepare a test sheet. Four pieces of the test sheet were placed in a gear oven type heating furnace wherein the atmosphere was kept at 110° C. so that one test piece could be taken out at every 100 hours, and a 400-hour thermal discoloration test was carried out. Similarly, four pieces of the test piece were placed in a Sunshine weather-O-meter, wherein the temperature of the black panel was adjusted to 83° C. so that one test piece could be taken out at every 100 hours, and a 400-hour photo-discoloration test was carried out. The judgement of the resistance to thermal discoloration and photo-discoloration was expressed by grade using the gray scale.

TABLE 1

| | Resistance to mold staining and amine resistance | | |
|---|---|---|---|
| | | Amine resistance | |
| | Resistance to mold staining | Resistance to thermal discoloration (grade) | Resistance to photo-discoloration (grade) |
| Example 1 | O | 3 | 4–3 |
| Example 2 | O | 3 | 4–3 |
| Example 3 | O | 4 | 5–4 |
| Example 4 | O | 4 | 5–4 |
| Example 5 | O | 4 | 5–4 |
| Comparative example 1 | X | 3 | 4–3 |
| Comparative | X | 3 | 4–3 |

TABLE 1-continued

| | Resistance to mold staining and amine resistance | | |
|---|---|---|---|
| | | Amine resistance | |
| | Resistance to mold staining | Resistance to thermal discoloration (grade) | Resistance to photo-discoloration (grade) |
| example 2 | | | |
| Comparative example 3 | Δ | 3 | 4–3 |
| Comparative example 4 | X | 4 | 5–4 |
| Comparative example 5 | X | 4 | 5–4 |

Note 1
Judgement of resistance to mold staining: According to the degree of cloudiness of nickel mirror plate.
O Little cloudiness is observed.
Δ Cloudiness is observed to some degree.
X Cloudiness is observed remarkably.
Note 2
Judgement of amine resistance:
Thermal resistance: Gear oven, 110° C. X 400 hours.
Light fastness: Sunshine weather-O-meter, 83° C. X 400 hours.
Judgement of discoloration: According to the grades on the gray scale.

What is claimed is:

1. In a powder resin composition for powder molding which comprises a dry-blended mixture of a polyvinyl chloride resin, a plasticizer, a stabilizer, a pigment and a filler, the improvement wherein the composition comprises a stabilizer mixture represented by the formula:

$$(RCOO)_2Me$$

wherein R represents a $C_5$–$C_8$ alkyl group and Me represents a mixture of barium and zinc in a metal weight ratio of 1:2 to 5:1 and at least one inorganic magnesium compound selected from the group consisting of magnesium oxide, magnesium hydroxide, magnesium phosphate, magnesium perchlorate, basic magnesium carbonate and inorganic magnesium/aluminum compounds, the amounts of said stabilizer mixture and said magnesium compound being 0.1–10 parts by weight and 0.1–5 parts by weight, respectively, based on 100 parts by weight of the polyvinyl chloride resin.

2. A molded resin material for covering a polyurethane article, said material being formed by rotational molding or slush molding of a dry blended mixture of a powder resin composition comprising a polyvinyl choloride resin, a plasticizer, a stabilizer, a pigment and a filler, the improvement wherein the composition comprises a stabilizer mixture represented by the formula:

$$(RCOO)_2Me$$

wherein R represents a $C_5$–$C_8$ alkyl group and Me represents a mixture of barium and zinc in a metal weight ratio of 1:2 to 5:1 and at least one inorganic magnesium compound selected from the group consisting of magnesium oxide, magnesium hydroxide, magnesium phosphate, magnesium perchlorate, basic magnesium carbonate and inorganic magnesium/aluminum compounds, the amounts of said stabilizer mixture and said magnesium compound being 0.1–10 parts by weight and 0.1–5 parts by weight, respectively, based on 100 parts by weight of the polyvinyl chloride resin.

3. A producing resin composition according to claim 2 in which the magnesium/aluminum compound is hydrotalcite.

* * * * *